(12) United States Patent
Yamamoto et al.

(10) Patent No.: US 12,308,143 B2
(45) Date of Patent: *May 20, 2025

(54) WIRING MEMBER

(71) Applicant: Sumitomo Wiring Systems, Ltd., Yokkaichi (JP)

(72) Inventors: Hironobu Yamamoto, Yokkaichi (JP); Kyungwoo Kim, Yokkaichi (JP); Toshinari Kobayashi, Yokkaichi (JP); Yukitoshi Terasaka, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 346 days.

This patent is subject to a terminal disclaimer.

(21) Appl. No.: 17/759,228

(22) PCT Filed: Jan. 8, 2021

(86) PCT No.: PCT/JP2021/000476
§ 371 (c)(1),
(2) Date: Jul. 21, 2022

(87) PCT Pub. No.: WO2021/149514
PCT Pub. Date: Jul. 29, 2021

(65) Prior Publication Data
US 2023/0051435 A1 Feb. 16, 2023

(30) Foreign Application Priority Data
Jan. 24, 2020 (JP) .................. 2020-009723

(51) Int. Cl.
*H01B 7/24* (2006.01)
*B60R 16/02* (2006.01)
(Continued)

(52) U.S. Cl.
CPC ............... *H01B 7/24* (2013.01); *H01R 13/58* (2013.01); *H01R 13/5845* (2013.01);
(Continued)

(58) Field of Classification Search
CPC ....... B60R 6/0207; B60R 6/0215; H01B 7/28; H01B 7/2806; H01B 7/0045
See application file for complete search history.

(56) References Cited

U.S. PATENT DOCUMENTS 2,933,550 A * 4/1960 Cole ...................... H02G 15/18
174/76
4,992,626 A * 2/1991 Monroe ............... H01B 7/0045
174/95
(Continued)

FOREIGN PATENT DOCUMENTS

JP S61-138415 A 6/1986
JP S63-123010 U 8/1988
(Continued)

OTHER PUBLICATIONS

International Search Report, Application No. PCT/JP2021/000476, mailed Feb. 9, 2021. ISA/Japan Patent Office.

*Primary Examiner* — Paresh Paghadal
(74) *Attorney, Agent, or Firm* — Honigman LLP

(57) ABSTRACT

Technology capable of reducing the number of tubular protective members in a wiring member is provided. The wiring member includes: multiple electric wires that branch into multiple branch lines from a main line at a branch position; a connection component provided at an end portion of a target branch line among the branch lines; and a resin molded body that includes a main body portion and an extending portion. The main body portion covers all of the electric wires at the branch position, and the extending portion extends from the main body portion and covers a (Continued)

portion of the target branch line that is between the main body portion and the connection component.

4 Claims, 6 Drawing Sheets

(51) Int. Cl.
    *H01R 13/58*         (2006.01)
    *H01B 7/00*          (2006.01)

(52) U.S. Cl.
    CPC .......... *B60R 16/0207* (2013.01); *H01B 7/009* (2013.01); *H01R 2201/26* (2013.01)

(56) References Cited

U.S. PATENT DOCUMENTS

| | | | | |
|---|---|---|---|---|
| 5,168,124 | A * | 12/1992 | Takase | H01R 4/70 174/72 A |
| 5,661,453 | A * | 8/1997 | Justus | B60R 16/0215 340/457.1 |
| 10,692,628 | B2 * | 6/2020 | Yamamoto | B60R 16/0207 |
| 11,101,055 | B2 * | 8/2021 | Kim | B60R 16/0215 |
| 2006/0219423 | A1 * | 10/2006 | Suzuki | B60R 16/0215 174/72 A |
| 2015/0175095 | A1 * | 6/2015 | Inao | B60R 16/0207 174/72 C |
| 2015/0246647 | A1 * | 9/2015 | Sugino | B60R 16/0215 174/102 R |
| 2016/0372236 | A1 * | 12/2016 | Yoshikawa | G02B 6/4472 |
| 2017/0154706 | A1 * | 6/2017 | Yamamoto | H01B 7/2825 |
| 2017/0313265 | A1 * | 11/2017 | Shimizu | H01B 7/0045 |
| 2019/0344733 | A1 | 11/2019 | Toyoshima et al. | |
| 2020/0254945 | A1 | 8/2020 | Murata et al. | |
| 2020/0262364 | A1 * | 8/2020 | Eshima | H02G 3/0406 |

FOREIGN PATENT DOCUMENTS

| | | |
|---|---|---|
| JP | 2003-305728 A | 10/2003 |
| JP | 2014-002982 A | 1/2014 |
| JP | 2014-063619 A | 4/2014 |

\* cited by examiner

WIRING MEMBER

CROSS-REFERENCE TO RELATED APPLICATIONS

This application is the U.S. national stage of PCT/JP2021/000476 filed on Jan. 8, 2021, which claims priority of Japanese Patent Application No. JP 2020-009723 filed on Jan. 24, 2020, the contents of which are incorporated herein.

TECHNICAL FIELD

The present disclosure relates to a wiring member.

BACKGROUND

JP 2017-98143A discloses a conductive path that includes one main line, two branch lines branched from the leading end portion of the main line, exterior bodies, water blocking members, and a resin molded body. The main line is obtained by covering a group of electric wires with a sheath. The leading end portions of the electric wires are exposed to the outside from the leading end face of the sheath to form the two branch lines. The exterior bodies have a substantially cylindrical shape and surround regions of the branch lines on the leading end sides thereof. The water blocking members seal gaps between the opening portion at the base end portion of the exterior body and the electric wires. The resin molded body is a single member in which the leading end portion of the main line, the base end portions of the two branch lines, the two water blocking members, and the base ends of the two exterior bodies are integrally formed by molding. At the branching portion, one branch line extends in a straight line from the main line, and the other branch line extends while curving away from the main line.

According to JP 2017-98143A, a tubular exterior body is attached to a portion of each of the branch lines located between the resin molded body and a connector. There is a desire to reduce the number of tubular exterior bodies in the conductive path described in JP 2017-98143A.

In view of this, an object of the present disclosure is to provide a technique capable of reducing the number of tubular protective members in a wiring member.

SUMMARY

A wiring member according to an aspect of the present disclosure includes: a plurality of electric wires that branch from a main line into a plurality of branch lines at a branch position; a connection component provided at an end portion of a target branch line among the plurality of branch lines; and a resin molded body that includes a main body portion and an extending portion, wherein the main body portion covers the plurality of electric wires at the branch position, and the extending portion extends from the main body portion and covers a portion of the target branch line that is between the main body portion and the connection component.

Advantageous Effects

According to the present disclosure, it is possible to reduce the number of tubular protective members in a wiring member.

DETAILED DESCRIPTION OF PREFERRED EMBODIMENTS

Figure 1:
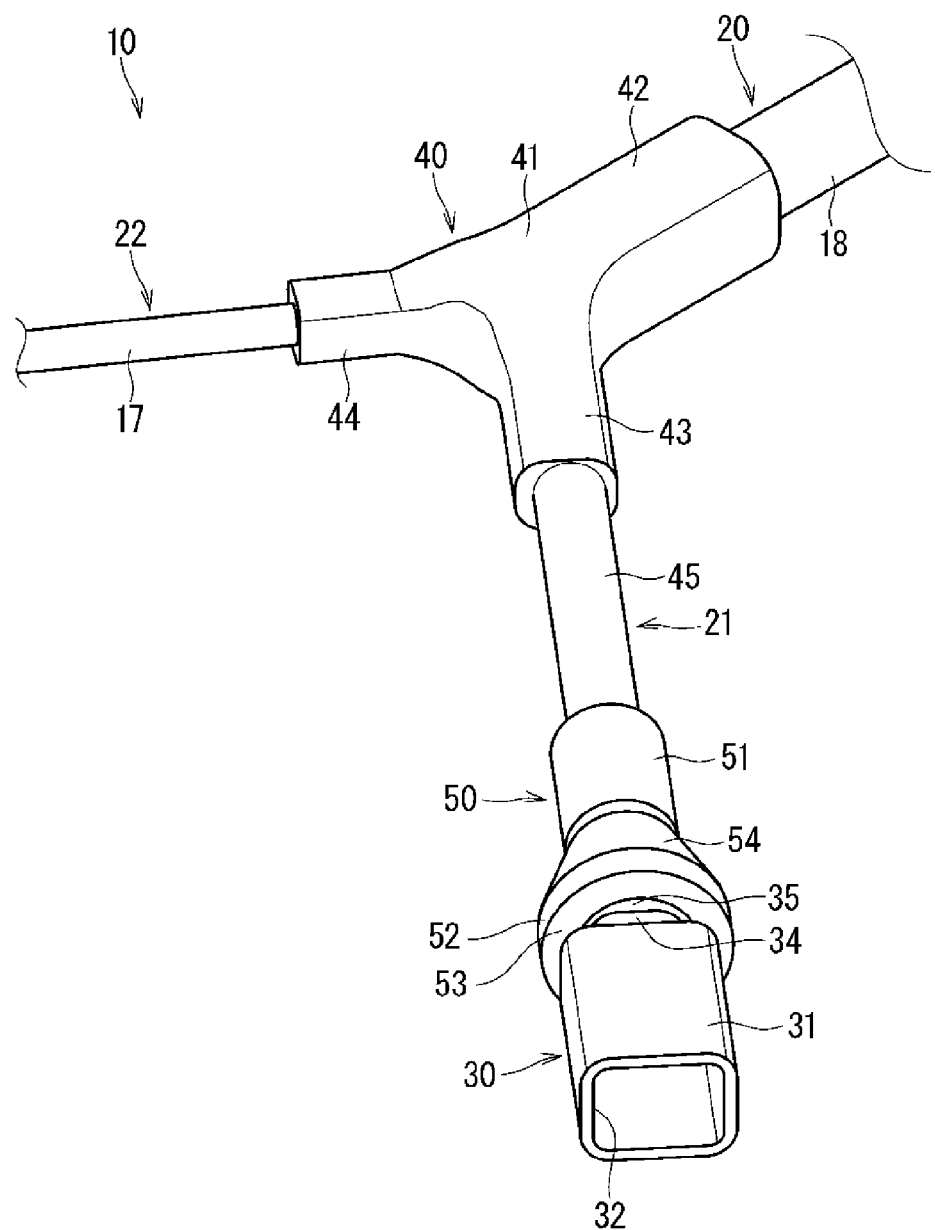
FIG. 1 is a schematic perspective view of a wiring member according to a first embodiment.

First, embodiments of the present disclosure will be listed and described.

Aspects of a wiring member according to the present disclosure are as follows.

First Aspect

A wiring member according to a first aspect includes: a plurality of electric wires that branch from a main line into a plurality of branch lines at a branch position; a connection component provided at an end portion of a target branch line among the plurality of branch lines; and a resin molded body that includes a main body portion and an extending portion, wherein the main body portion covers the plurality of electric wires at the branch position, and the extending portion extends from the main body portion and covers a portion of the target branch line that is between the main body portion and the connection component. Providing the extending portion makes it possible to reduce the number of tubular protective members.

Second Aspect

In a second aspect, the wiring member according to aspect 1, the connection component may include a connector housing in which an end portion of the target branch line is accommodated, and the extending portion may extend to a position not reaching the connector housing. Accordingly, the portion of the target branch line between the main body portion and the connector housing is covered by the extending portion.

Third Aspect

In a third aspect, the wiring member according to aspect 2 may further include a connector cover that covers a section from a leading end portion of the extending portion to a rear end portion of the connector housing. Accordingly, the portion of the target branch line that extends from the connector housing is protected by the connector cover.

Fourth Aspect

In a fourth aspect, the wiring member according to aspect 1, the connection component may include a connector housing in which an end portion of the target branch line is accommodated, and the extending portion may cover a rear end portion of the connector housing. Accordingly, if a member that covers the connector housing is provided, the connector cover can also be omitted.

Fifth Aspect

In a fifth aspect, the wiring member according to any one of aspects 1 to 4, a wall thickness of the extending portion may be smaller than a wall thickness of the main body portion. Accordingly, it is possible to suppress an increase in weight caused by the provision of the extending portion.

Sixth Aspect

In a sixth aspect, the wiring member according to any one of aspects 1 to 5, the target branch line may include a bent portion, and the extending portion may maintain the bent portion in a bent shape. Accordingly, the branch line is maintained in a bent state by the extending portion.

Specific examples of a wiring member according to the present disclosure will be described below with reference to the drawings. It should be noted that the present disclosure is not limited to these examples, but rather is indicated by the scope of the claims and is intended to include all modifications within a meaning and scope equivalent to the scope of the claims.

First Embodiment

Figure 2:
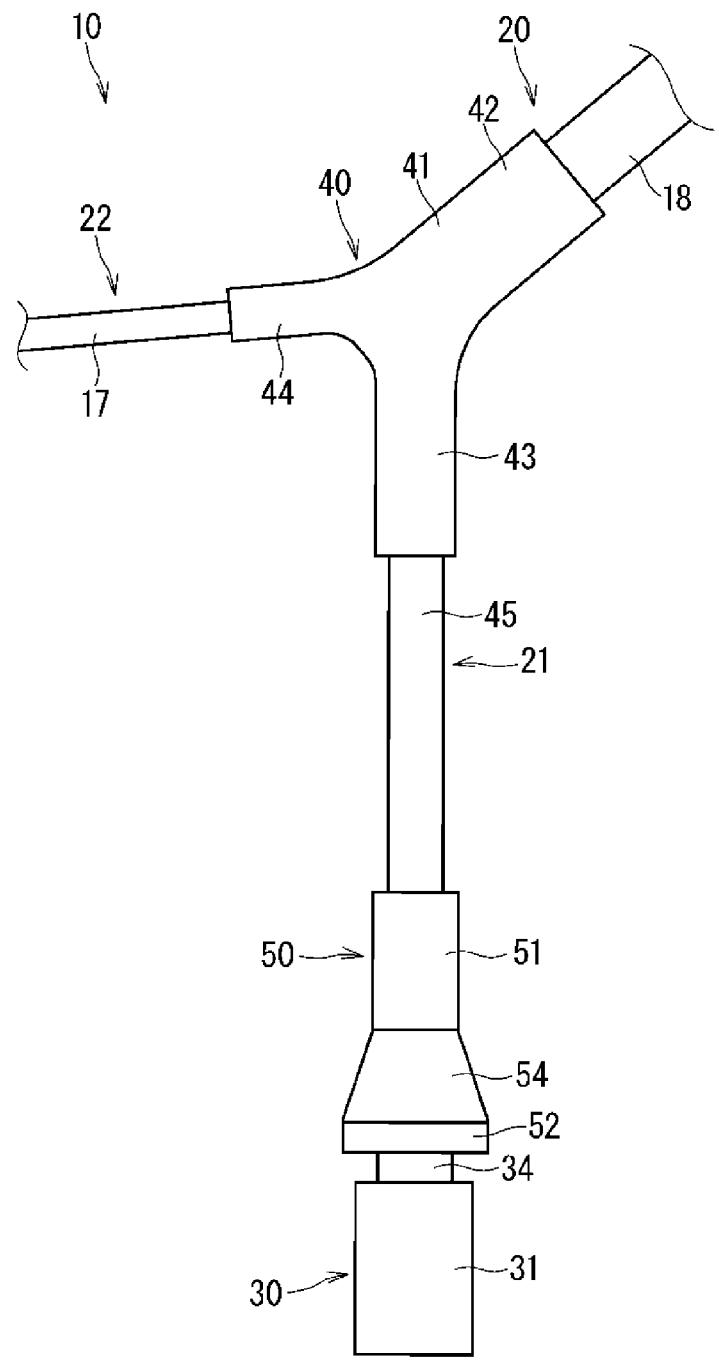
FIG. 2 is a schematic plan view of the wiring member according to the first embodiment.
Figure 3:
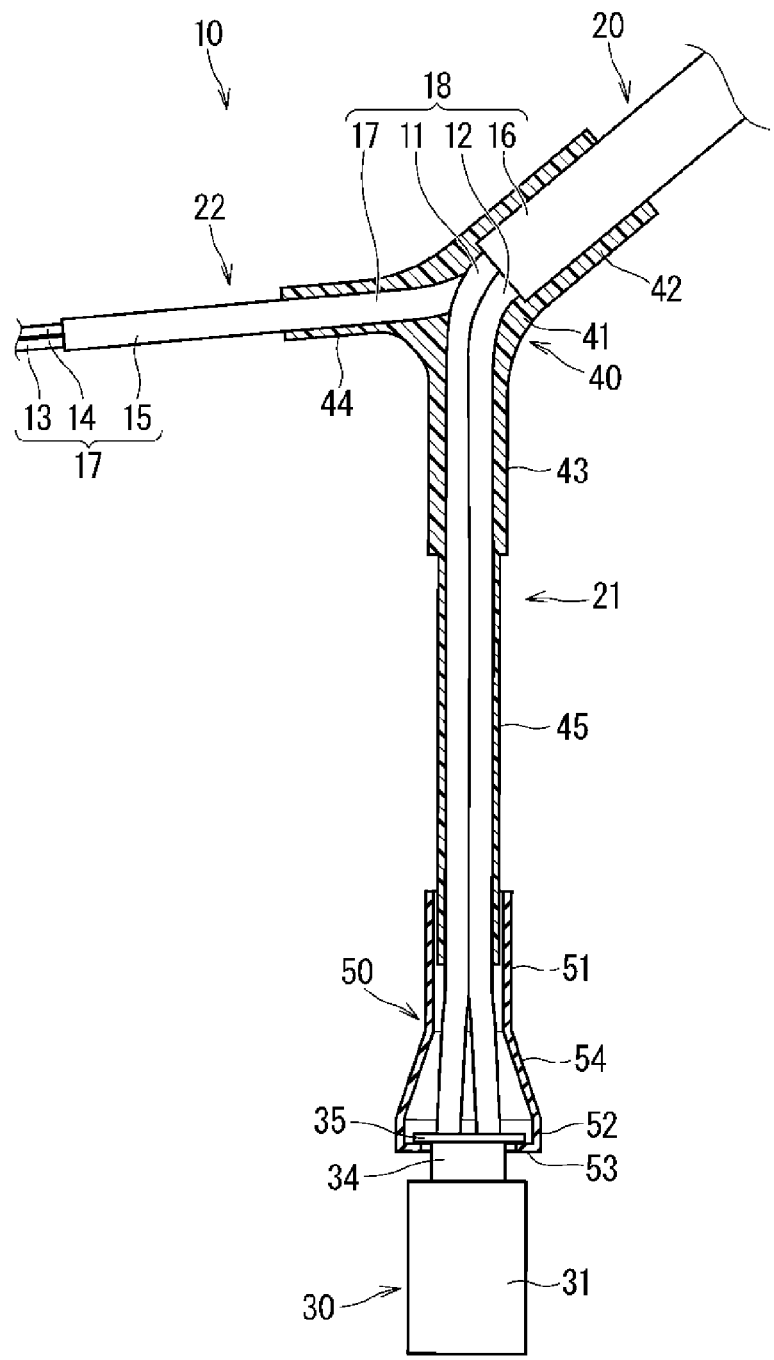
FIG. 3 is a schematic vertical sectional view of the wiring member according to the first embodiment.

Hereinafter, a wiring member according to a first embodiment will be described. FIG. 1 is a schematic perspective view of a wiring member 10 according to the first embodiment. FIG. 2 is a schematic plan view of the wiring member 10 according to the first embodiment. FIG. 3 is a schematic vertical sectional view of the wiring member 10 according to the first embodiment. In FIG. 3, only some members are shown in a cross-sectional view.

The wiring member 10 is used as wiring for connecting electric devices to each other in a vehicle, for example. The wiring member 10 in the following description is a wiring member 10 for use in the underbody of a vehicle. The wiring member 10 connects a body-side device and a wheel-side device. The wiring member 10 may be applied to another part of the vehicle. The wiring member 10 includes electric wires 11, 12, 13, and 14, a connection component, and a resin molded body 40. The wiring member 10 further includes a connector cover 50.

At a branch position, the electric wires 11, 12, 13, and 14 branch from the main line 20 into branch lines 21 and 22. Here, four electric wires 11, 12, 13, and 14 are included. The four electric wires 11, 12, 13, and 14 are each a coated electric wire that includes a core wire and a coating layer that covers the core wire. The core wire includes one or more strands. The strands are formed using a conductor such as copper, a copper alloy, aluminum, or an aluminum alloy. The coating layer is formed using an insulating material such as a resin. The coating layer is formed by extruding an insulating material around the core wire, or by being applied and then heated. The four electric wires 11, 12, 13, and 14 are single-core electric wires that form one conductive path.

A sheath 15 is provided around the two electric wires 13 and 14. The two electric wires 13 and 14 form a cable 17 in a section that includes the branch position. A sheath 16 is provided around the one cable 17 and the remaining two electric wires 11 and 12 of the main line 20. In the main line 20, the electric wires 11, 12, 13, and 14 form a cable 18. The end portion of the sheath 16 is located at the branch position. The pair of electric wires 11 and 12 and the one cable 17 branch away from each other at the branch position. The sheaths 15 and 16 are formed using a resin material such as polyurethane. Note that either one of the sheaths 15 and 16 may be omitted, or both may be omitted.

In the underbody wiring member 10, the electric wires 11 and 12 are used for an EPB (Electric Parking Brake). The electric wires 11 and 12 are power lines. The cable 17 is used for an ABS (Antilock Braking System) sensor. The electric wires 13 and 14 of the cable 17 are signal lines. Of course, the connection destinations and the uses of the electric wires 11, 12, 13, 14 are not limited to these examples, and can be set as appropriate.

Here, there are two branch lines 21 and 22. The two electric wires 11 and 12 extend in the branch line 21. The cable 17 extends in the branch line 22. There may be three or more branch lines. The electric wires 11, 12, 13, and 14 of the branch lines 21 and 22 all extend from the main line 20. There is no electric wire that extends from the one branch line 21 to the other branch line 22. There may be an electric wire that extends from one of the branch lines to another branch line.

The connection component includes a connector housing 30. The connector housing 30 is provided at the end portion of the branch line 21. The branch line 21 is the target branch line. The end portion of the branch line 21 is housed in the connector housing 30. The connection component may include connector terminals. A connector terminal is provided at the end portion of each of the electric wires 11 and 12. The connector terminals are connected to the core wires at the end portions of the electric wires 11 and 12 by crimping, pressure welding, welding, or the like.

The connector housing 30 includes a partner connection portion 31, a protrusion portion 34, and a flange 35. In the connector housing 30, the side for connection to a partner connector is the front side. The partner connection portion 31 is located in a front end portion of the connector housing 30. The partner connection portion 31 has a rectangular parallelepiped shape. The partner connection portion 31 is a portion for connection to the partner connector. As shown in FIG. 1, here, the partner connection portion 31 includes an opening portion 32. Accordingly, the partner connection portion 31 is the so-called female side. The partner male-shaped connector is inserted into the opening portion 32. The partner connection portion 31 may be the male side.

The protrusion portion 34 and the flange 35 are located in a rear end portion of the connector housing 30. The protrusion portion 34 protrudes rearward from the partner connection portion 31. The outer shape of the protrusion portion 34 is smaller than the outer shape of the partner connection portion 31. The flange 35 projects circumferentially outward from a rear end portion of the protrusion portion 34. The protrusion portion 34 and the flange 35 have a quadrangular transverse sectional shape (here, a rectangular shape with rounded corners). The protrusion portion 34 and the flange 35 may have another transverse sectional shape such as a circular shape. The protrusion portion 34 and the flange 35 are covered by the connector cover 50. The flange 35 may be omitted from the connector housing 30. Also, both the protrusion portion 34 and the flange 35 may be omitted from the connector housing 30.

The connector housing 30 is a molded part that is separate from the end portions of the electric wires 11 and 12, that is to say a molded part that does not have the end portions of the electric wires 11 and 12 as insert parts. The connector housing 30 is provided with a plurality of cavities that pass therethrough from the rear end surface to the front end surface (here, a surface inside the opening portion 32). The end portions of electric wires 11 and 12 having the connector terminals are each inserted into a respective cavity. However, the connector housing 30 may be an insert-molded body that has the end portions of the electric wires 11 and 12 as insert parts.

Note that a connection component separate from the connector housing 30 is provided at the end portion of the branch line 22. Here, the electric wires 13 and 14 of the branch line 22 are signal lines for an ABS sensor. For example, the connection component at the end portion of the branch line 22 is incorporated in a sensor head.

The resin molded body 40 is an insert-molded body that has the electric wires 11, 12, 13, and 14 as insert parts. The resin molded body 40 includes a main body portion 41 and an extending portion 45.

The main body portion 41 covers the electric wires 11, 12, 13, and 14 at the branch position. The main body portion 41 includes a main line covering portion 42 and branch line covering portions 43 and 44. The main line covering portion 42 is a portion that covers the main line 20. The branch line covering portions 43 and 44 are portions that cover the branch lines 21 and 22, respectively. Here, the branch line covering portions 43 and 44 are respectively provided for both of the two branch lines 21 and 22. The main body portion 41 is shaped such that end portions of the three covering portions 42, 43, and 44 on one side intersect at the branch position. However, a configuration is possible in which the branch lines 21 and 22 are not provided with the branch line covering portions 43 and 44.

In the main body portion 41, the main line covering portion 42 and the branch line covering portions 43 and 44 have quadrangular transverse sectional shapes (here, a quadrangular shape with rounded corners). However, in the main body portion 41, the main line covering portion 42 and the branch line covering portions 43 and 44 may have a transverse sectional shape other than a quadrangular shape, such as a circular shape.

The extending portion 45 is a portion that extends from the main body portion 41. The extending portion 45 covers a portion of the branch line 21 located between the main body portion 41 and the connection component. An extending portion is not provided for the branch line 22. This is because the sheath 15 is provided around the electric wires 13 and 14 of the branch line 22, and thus there is little need for further protection. Of course, an extending portion may be provided for the branch line 22.

The extending portion 45 has a circular transverse sectional shape. However, the extending portion 45 may have a transverse sectional shape other than a circular shape, such as a quadrangular shape.

Here, out of the branch line covering portion 43 and the extending portion 45, the extending portion 45 is longer. However, out of the branch line covering portion 43 and the extending portion 45, it may be the branch line covering portion 43 that is longer. Alternatively, the branch line covering portion 43 and the extending portion 45 may have the same length.

The extending portion 45 extends to a position not reaching the connector housing 30. There is a gap between the extending portion 45 and the connector housing 30. There are no particular limitations on the size of the gap along the branch line 21. For example, the gap may be 70 mm or less. The gap may be 40 mm or more, for example. The extending portion 45 extends to a position where it can be covered by the connector cover 50.

The section of the branch line 21 located between the branch position and the connection component is a target section. Here, the target section is the section between the end portion of the sheath 16 and the connector housing 30. In the target section, the electric wires 11 and 12 of the branch line 21 are not covered by the sheath 16 and the connector housing 30. 70% or more of the target section is covered by the main body portion 41 and the extending portion 45. 80% or more of the target section may be covered by the main body portion 41 and the extending portion 45. 90% or more of the target section may be covered by the main body portion 41 and the extending portion 45. The extending portion 45 may reach the connector housing 30. The entire length of the target section may be covered by the main body portion 41 and the extending portion 45.

The wall thickness of the extending portion 45 is thinner than the wall thickness of the main body portion 41 (branch line covering portion 43). The wall thickness of the extending portion 45 may be the same as or thicker than the wall thickness of the main body portion 41 (branch line covering portion 43). Note that in the case where the portion of the resin molded body that covers the branch line 21 is formed so as to be uniform along the lengthwise direction of the branch line 21, the entirety of the portion that covers the branch line 21 is considered to be the extending portion.

The main body portion 41 regulates the directions in which the main line 20 and the branch lines 21 and 22 extend. The main line 20 and the branch lines 21 and 22 are difficult to bend in portions thereof that are covered by the main body portion 41. The main body portion 41 has a rigidity that makes bending difficult.

The extending portion 45 maintains the direction in which the branch line 21 extends. The portion of the branch line 21 covered by the extending portion 45 is held in a predetermined shape (here, a straight line). The portion of the branch line 21 covered by the extending portion 45 is bendable. The extending portion 45 has a rigidity that allows bending.

The connector cover 50 covers a section from the leading end portion of the extending portion 45 to the rear end portion of the connector housing 30. The connector cover 50 is formed using an elastic material such as rubber. The connector cover 50 may be formed using a material other than an elastic material, such as a resin. The connector cover 50 has a tubular shape. One end portion of the branch line 21 is inserted into the connector cover 50. The connector cover 50 includes a small tube portion 51, a large tube portion 52, and a connecting tube portion 54.

The small tube portion 51 and the large tube portion 52 have a cylindrical shape. One end portion of the connector cover 50 is the small tube portion 51. The other end portion of the connector cover 50 is the large tube portion 52. The outer diameter of the large tube portion 52 is larger than the outer diameter of the small tube portion 51. The inner diameter of the large tube portion 52 is larger than the inner diameter of the small tube portion 51. The connecting tube portion 54 connects the small tube portion 51 and the large tube portion 52. The connecting tube portion 54 has a truncated cone shape. The outer diameter and the inner diameter of the connecting tube portion 54 gradually increase from the small tube portion 51 side toward the large tube portion 52 side. The transverse cross section of the connector cover 50 may have an oval shape.

The large tube portion 52 covers the rear end portion of the connector housing 30. The large tube portion 52 covers the protrusion portion 34 and the flange 35. A bulging portion 53 that bulges inward is provided at the opening portion of the large tube portion 52. Accordingly, the inner diameter of the portion of the large tube portion 52 where the bulging portion 53 is provided is smaller than the inner diameter of the portion of the large tube portion 52 where the bulging portion 53 is not provided. The portion of the large tube portion 52 provided with the bulging portion 53 covers the protrusion portion 34. The portion of the large tube portion 52 not provided with the bulging portion 53 covers the flange 35. The inner diameter of the portion of the large tube portion 52 provided with the bulging portion 53 is larger than the outer diameter of the flange 35 (outer diameter along the short side direction). Accordingly, the flange 35 and the bulging portion 53 are locked.

The small tube portion 51 covers the leading end portion of the extending portion 45 in a state where the large tube portion 52 covers the rear end portion of the connector housing 30. The inner diameter of the small tube portion 51 may be smaller than the outer diameter of the extending portion 45. In this case, the small tube portion 51 undergoes elastic deformation so as to expand in diameter, and is in close contact with the extending portion 45. The inner diameter of the small tube portion 51 may be the same as or larger than the outer diameter of the extending portion 45.

The length dimension of the connector cover 50 along the axial direction is longer than the length of the gap between the extending portion 45 and the connector housing 30. The length dimension of the connector cover 50 along the axial direction is shorter than the length dimension of the extending portion 45.

Effects Etc. of First Embodiment

According to the wiring member 10 configured as described above, providing the extending portion 45 makes it possible to reduce the number of tubular protective members.

Also, the extending portion 45 extends to a position not reaching the connector housing 30, and therefore the portion of the branch line 21 between the main body portion 41 (branch line covering portion 43) and the connector housing 30 is covered by the extending portion 45.

Also, the wiring member 10 further includes the connector cover 50 that covers a section from the leading end portion of the extending portion 45 to the rear end portion of the connector housing 30, and therefore the portion of the branch line 21 that extends from the connector housing 30 is protected by the connector cover 50.

Also, the wall thickness of the extending portion 45 is thinner than the wall thickness of the main body portion 41 (branch line covering portion 43), thus making it possible to suppress an increase in weight caused by the provision of the extending portion 45.

Second Embodiment

Figure 4:
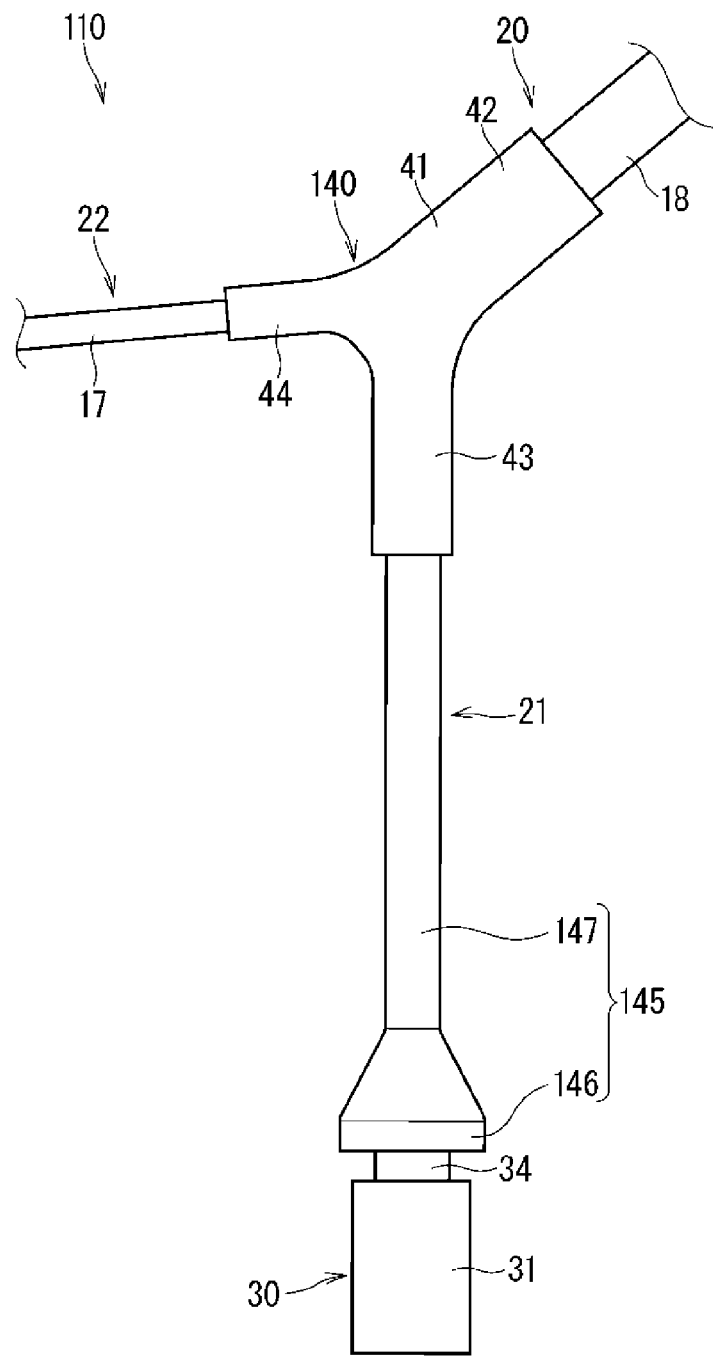
FIG. 4 is a schematic plan view of a wiring member according to a second embodiment.
Figure 5:
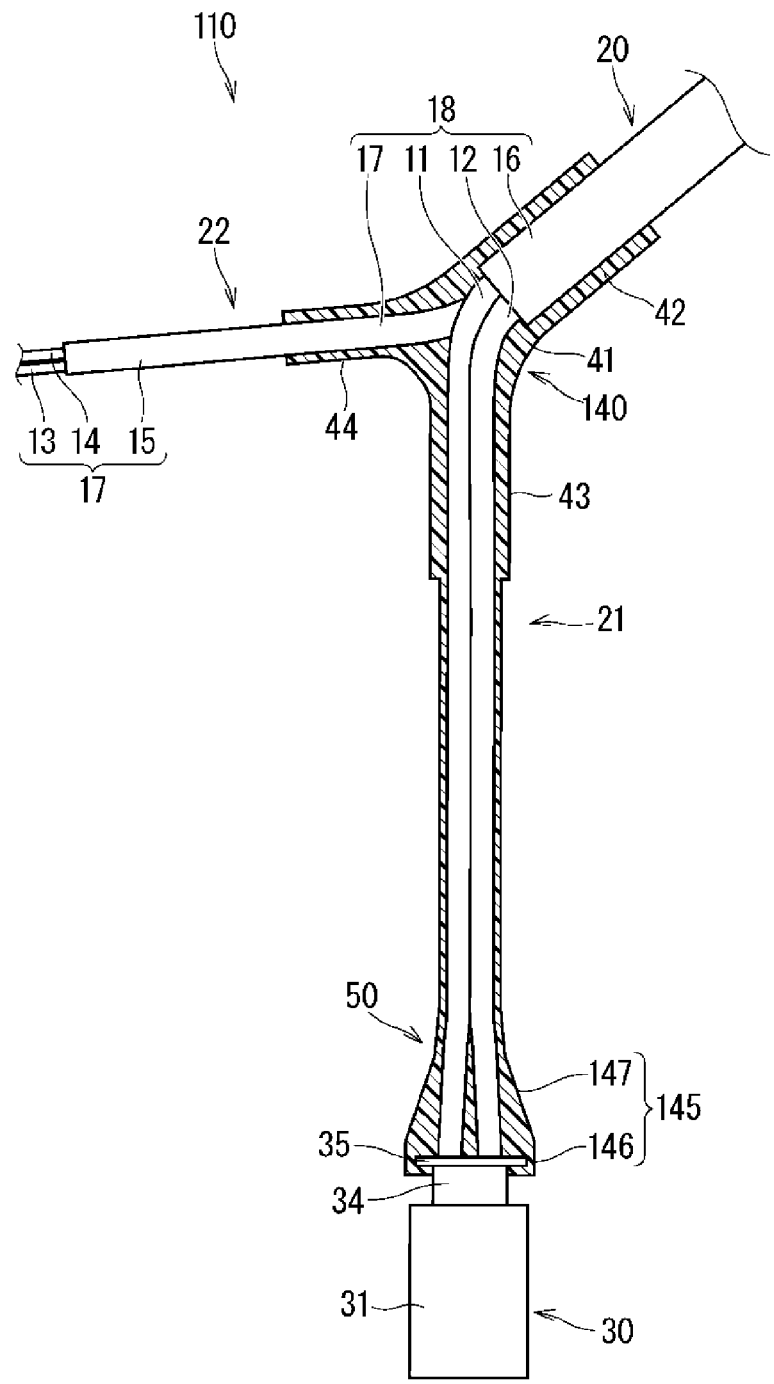
FIG. 5 is a schematic vertical sectional view of the wiring member according to the second embodiment.

The following describes a wiring member according to a second embodiment. FIG. 4 is a schematic plan view of a wiring member 110 according to the second embodiment. FIG. 5 is a schematic vertical sectional view of the wiring member 110 according to the second embodiment. Note that in the description of the present embodiment, components that are the same as those described thus far are designated by the same reference numerals, and descriptions thereof will be omitted.

The shape of an extending portion 145 of the wiring member 110 is different from the shape of the extending portion 45 of the wiring member 10. The extending portion 145 covers the rear end portion of the connector housing 30. In a state where the end portion of the branch line 21 housed in the connector housing 30, the rear end portion of the connector housing 30 is also used as an insert part when molding the resin molded body 140. The extending portion 145 includes a housing covering portion 146 and a wire covering portion 147.

The housing covering portion 146 covers the rear end portion of the connector housing 30. The housing covering portion 146 covers the protrusion portion 34 and the flange 35. This therefore suppresses exposure of the branch lines 21 and 22 in the section between the resin molded body portion 40 and the connector housing 30.

The wire covering portion 147 is continuous with the housing covering portion 146. The electric wire covering portion 147 covers portions of the electric wires 11 and 12 of the branch line 21 that are not housed in the connector housing 30. The leading end portion of the wire covering portion 147, which is connected to the housing covering portion 146, gradually decreases in diameter while extending away from the housing covering portion 146.

Effects Etc. of Second Embodiment

With the wiring member 110 configured as described above as well, providing the extending portion 145 makes it possible to reduce the number of tubular protective members.

Also, according to the wiring member 110, the extending portion 145 covers the rear end portion of the connector housing 30, and therefore the connector cover 50 can also be omitted if a member that covers the connector housing 30 is provided.

Third Embodiment

Figure 6:
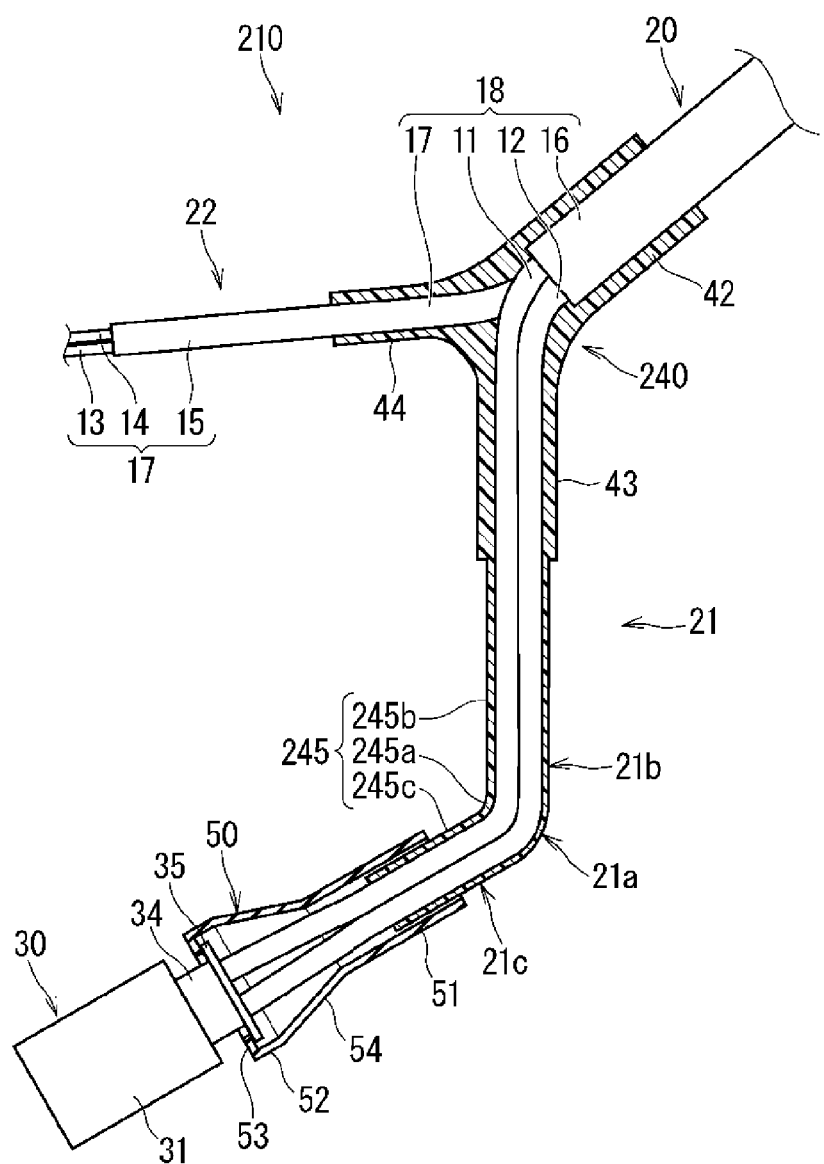
FIG. 6 is a schematic vertical sectional view of a wiring member according to a third embodiment.

The following describes a wiring member according to a third embodiment. FIG. 6 is a schematic vertical sectional view of a wiring member 210 according to the third embodiment. Note that in the description of the present embodiment, components that are the same as those described thus far are designated by the same reference numerals, and descriptions thereof will be omitted.

In the wiring member 210, the shape of an extending portion 245 of a resin molded body 240 is different from the shape of the extending portions 45 and 145 of the wiring members 10 and 110. Whereas the extending portions 45 and 145 have a straight shape, the extending portion 245 has a bent shape.

More specifically, the branch line 21 has a bent portion 21a and straight portions 21b and 21c. The bent portion 21a is a portion that extends along a bent path. The bent portion 21a is bent in the same plane as the plane formed by the main line 20 and the branch lines 21 and 22 at the branch position. The bent portion 21a may be bent in a direction that intersects the plane formed by the main line 20 and the branch lines 21 and 22 at the branch position. In the example shown in FIG. 6, the angle of the bent portion 21a is 60 degrees. The angle of the bent portion 21a may be smaller or larger than 60 degrees. The bent portion 21a is provided in an intermediate portion of the branch line 21. The bent portion 21a is located between the straight portions 21b and 21c. The extending portion 245 maintains the bent portion 21a in the bent shape. The extending portion 245 includes a bent portion covering portion 245a and straight portion covering portions 245b and 245c.

The bent portion covering portion 245a is a portion that covers the bent portion 21a. The bent portion covering portion 245a has a bent shape that corresponds to the bent portion 21a. The bent portion covering portion 245a maintains the bent portion 21a in the bent shape. The bent portion covering portion 245a is provided between the straight portion covering portions 245b and 245c. The straight portion covering portion 245b is a portion that covers the straight portion 21b. The straight portion covering portion 245c is a portion that covers the straight portion 21c. The wall thickness of the bent portion covering portion 245a and the wall thickness of the straight portion covering portions 245b and 245c are the same. Either the wall thickness of the bent portion covering portion 245a or the wall thickness of the straight portion covering portions 245b and 245c may be larger than the other one.

The bent portion 21a may further be able to bend while covered by the bent portion covering portion 245a. The bent portion covering portion 245a may have a rigidity that allows bending. The bent portion covering portion 245a may regulate the direction in which the bent portion 21a extends. The bent portion 21a may be difficult to bend when covered by the bent portion covering portion 245a. The bent portion covering portion 245a may have a rigidity that makes bending difficult. In the extending portion 245, the bent portion covering portion 245a may partially have a rigidity that makes bending difficult. In the extending portion 245, the bent portion covering portion 245a may partially have an increased wall thickness. The entirety of the extending portion 245 may be difficult to bend.

Effects Etc. of Third Embodiment

With the wiring member 210 configured as described above as well, providing the extending portion 245 makes it possible to reduce the number of tubular protective members.

Also, according to the wiring member 210, the extending portion 245 maintains the bent portion 21a in the bent shape, and thus the path of the branch line 21 is maintained in a bent state by the extending portion 245. Also, when installed in a vehicle, there are cases where the wiring member 210 is bent at an angle greater than or equal to the angle of the bent portion 21a maintained by the bent portion covering portion 245a (here, 60 degrees). In such a case, due to the bent portion covering portion 245a being provided in advance in the extending portion 245, even if the bent portion 21a is further bent toward a predetermined angle, the amount of deformation of the extending portion 245 is lower than in the case where the extending portion 245 is bent from a straight shape to the predetermined bending angle.

VARIATIONS

A tape winding protection portion may additionally be provided around the extending portion 45, 145, or 245. The tape winding protection portion is formed by winding a piece of adhesive tape around the extending portion 45, 145, or 245. There are no particular limitations on the method of winding the adhesive tape. The adhesive tape may be wound spirally or vertically, for example. Here, vertical winding is a winding method in which the adhesive tape is wound such that the width direction of the adhesive tape corresponds to the circumferential direction of the extending portion 45, 145, or 245. The adhesive tape may be wound around only a portion of the extending portion 45, 145, or 245, or around the entirety thereof. Depending on the molding conditions of the extending portion 45, 145, or 245, the extending portion 45, 145, or 245 may partially include a reduced wall thickness portion. The tape winding protection portion may be provided in the portion of the extending portion 45, 145, or 245 that has a reduced wall thickness.

Also, the main body portion 41 may have a rigidity that allows bending, similarly to the extending portion 45. In this case, the main line 20 and the branch lines 21 and 22 are bendable in the portions thereof that are covered by the main body portion 41. Also, in this case, it is preferable that the main body portion 41 maintains the directions in which the main line 20 and the branch lines 21 and 22 extend.

Also, the extending portion 45, 145, or 245 may have rigidity that makes bending difficult, similarly to the main body portion 41. In this case, the extending portion 45, 145, or 245 regulates the direction in which the branch line 21 extends. Also, the portion of the branch line 21 that is covered by the extending portion 45, 145, or 245 is difficult to bend.

It should be noted that the configurations described in the above-described embodiments and modifications can be appropriately combined as long as no contradiction arises. For example, the housing covering portion 146 described in the second embodiment and the bent portion covering portion 245a described in the third embodiment may be provided in the extending portion of the same resin molded body.

The invention claimed is:

1. A wiring member comprising:
a plurality of electric wires that branch from a main line into a plurality of branch lines at a branch position;
a connection component provided at an end portion of a target branch line among the plurality of branch lines; and
a resin molded body that includes a main body portion and an extending portion, the main body portion and the extending portion formed as a unitary piece,
wherein the main body portion covers the plurality of electric wires at the branch position,
the extending portion extends from the main body portion and covers a portion of the target branch line that is between the main body portion and the connection component,
the connection component includes a connector housing in which an end portion of the target branch line is accommodated,
the extending portion having a distal end spaced apart from the connector housing,
the wiring member further comprises a connector cover that covers the distal end of the extending portion to a rear end portion of the connector housing,
the resin molded body is an insert-molded body having the plurality of electric wires as insert parts, and
the connector cover is formed using an elastic material,
wherein the connector housing includes a flange, and
wherein the connector cover encloses a surface of the flange that faces the connector housing.

2. The wiring member according to claim 1, wherein a wall thickness of the extending portion is smaller than a wall thickness of the main body portion.

3. The wiring member according to claim 1, wherein the target branch line includes a bent portion, and
the extending portion maintains the bent portion in a bent shape.

4. The wiring member according to claim 2, wherein the target branch line includes a bent portion, and
the extending portion maintains the bent portion in a bent shape.

* * * * *